United States Patent [19]

Morimoto et al.

[11] Patent Number: 5,241,437
[45] Date of Patent: Aug. 31, 1993

[54] SIGNAL RECORDING-REPRODUCING APPARATUS HAVING A SUPPORTING PLATE

[75] Inventors: Masao Morimoto, Fuji; Hironori Nomura, Chichibu, both of Japan

[73] Assignee: Canon Denshi Kabushiki Kaisha, Chichibu, Japan

[21] Appl. No.: 720,370

[22] Filed: Jun. 25, 1991

[30] Foreign Application Priority Data

Jun. 27, 1990 [JP] Japan .................................. 2-166680
Nov. 22, 1990 [JP] Japan .................................. 2-319512
Nov. 22, 1990 [JP] Japan .................................. 2-319513

[51] Int. Cl.$^5$ .............................................. G11B 5/48
[52] U.S. Cl. .................................................. 360/104
[58] Field of Search ................................ 360/104, 103

[56] References Cited

U.S. PATENT DOCUMENTS 4,882,644 11/1989 Kimura et al. ...................... 360/104

FOREIGN PATENT DOCUMENTS 61-239470 10/1986 Japan ................................. 360/104

Primary Examiner—John H. Wolff
Attorney, Agent, or Firm—Spencer, Frank & Schneider

[57] ABSTRACT

In a signal recording and/or reproducing device having a chassis, a read/write head assembly includes a read/write head for sliding in contact with a surface of a moving flexible recording medium and for reading information from and writing information onto the surface of the moving flexible recording medium, and a head supporting plate for elastically supporting the read/write head. The head supporting plate includes a first supporting frame for mounting the read/write head, a second supporting frame elastically connected to the first supporting frame by a first pair of tie bar portions, and a third supporting frame for fixing the head supporting plate to the chassis of the recording and/or reproducing device. The third supporting frame is elastically connected to the second supporting frame by a second pair of tie bar portions. Connecting points between the first pair of tie bar portions and the first supporting frame mounting the read/write head are disposed nearer a trailing side of the read/write head with respect to a direction of movement of the recording medium than connecting points between the first pair of tie bar portions and the second supporting frame.

11 Claims, 8 Drawing Sheets

SIGNAL RECORDING-REPRODUCING APPARATUS HAVING A SUPPORTING PLATE

BACKGROUND OF THE INVENTION

1. Field of the Invention

The present invention relates to a signal recording-reproducing apparatus for recording and/or reproducing the signal on and/or from a moving recording medium, and in particular to a signal recording-reproducing apparatus which is equipped with a supporting plate for elastically supporting a read/write element such as a magnetic head and the like relative to a recording medium.

2. Description of the Prior Art

It is well known that flexible disk drivers (FDD's) are used as external data storage for computers and the like for magnetically reading information from and/or writing information on a flexible magnetic disk. Recently such FDDs are progressing rapidly in miniaturization and high capacity so that they are required to have high recording density. In this respect, it is well known that increasing recording frequency and narrowing the magnetic gap of a magnetic head is useful to attain high recording density.

However, when the magnetic gap is narrowed in width, for example, the variations in spacing between a disk and the magnetic head due to warping of the magnetic disk or the like have a bad influence on the output characteristics of the magnetic head.

Therefore, it is required to maintain the above mentioned spacing as small as possible by stabilizing the contact between the magnetic head and the magnetic disk. In order to satisfy the above-mentioned requirement, referring to FIG. 1, a head supporting plate 1 is generally used for conventional FDD's. The head supporting plate 1 is made of a flexible and elastic material and includes first, second and third concentric supporting frames 1a, 1b and 1c which are arranged concentrically from the center of the supporting plate 1 to the outside. A magnetic head 2 is mounted on the first supporting frame 1a and the third support frame 1c is mounted on a head arm (not shown). Thus, the magnetic head 2 is installed in the head arm (not shown) through the head supporting plate 1.

The supporting frames 1a, 1b and 1c are interconnected through first and second tie bars 1e and 1d in such a way that the first and second supporting frames 1a and 1b are swingable relative to the third supporting frame 1c. More specifically, as shown in FIG. 1, the first tie bars 1e interconnect the first and second supporting frames 1a and 1b in the direction (indicted by the arrow X) perpendicular to the direction of relative motion between the magnetic head 2 and a disk (not shown), so that the first supporting frame 1a can swing in the directions indicated by A and B in FIG. 1 relative to the third supporting frame 1c by the elastic deformations (torsional displacements) of the first tie bars 1e and also can move freely in the vertical direction indicated by the arrow Z. In like manner, as shown in FIG. 1, the second tie bars 1d interconnect the second and third supporting frames 1b and 1c in the direction (indicated by the arrow Y) of relative motion between the magnetic head 2 and the disk. Therefore, owing to the elastic deformations of the second tie bars 1d, the first supporting frame 1a can swing in both directions indicated by C and D as shown in FIG. 1 relative to the third supporting frame 1c through the second supporting frame 1b and furthermore can move freely in the vertical direction indicated by the arrow Z.

As described above, in the prior art, so far the magnetic head arm 2 is installed in such a way that it can swing relative to the head arm, whereby the magnetic head 2 can follow the surface of the disk. A pair of magnetic heads 2 supported by the head supporting plates 1 in the manner described above are each disposed on both faces of the disk, so that the disk is sandwiched and held by the magnetic heads 2. In the case of such construction described above, the head supporting plate 1 is energized by one or more springs (not shown) so as to press against the disk.

However, when the disk is rotated with the magnetic heads 2 being supported by the head supporting plates 1, respectively, as shown in FIG. 2, the rotation moments MA and MB in the directions A and B (see FIG. 1) are produced on the side at which the disk 3 leaves the magnetic heads 2 such that the head 2 is caused to lift from the surface of disk 3 owing to the rotation of a disk 3 in one direction (indicated by the arrow R) and contact pressure force of the springs. Furthermore, in the case of the head supporting plate 1 of the conventional type described above, the second tie bars 1d can swing freely in both directions A and B (See FIG. 1) so that when the rotation moments MA and MB in the directions A and B are produced, as best shown in FIG. 2, one side end of each magnetic head 2 very frequently tends to lift and consequently moved away from the surface of the disk 3. As a result, there has been the problem that a loss of spacing occurs. In order to solve such a problem, it has been proposed to increase the pressure forces of the springs, but this causes the frictional force produced between the magnetic heads 2 and the disk 3 to be increased, resulting in a decrease of durability of the magnetic disk or the like.

Furthermore, the upper head supporting plate 1 is forcibly pressed against the surface of the disk 3 by the spring so that the lower head supporting plate 1 is forced to be flexed as shown in FIG. 3B. When the disk 3 is rotated under the condition that each magnetic head 2 is supported by the head supporting plates 1 in the manner described above so that the disk 3 is wound upward as shown in FIG. 3A, the magnetic head 2 follows the disk 3 so as to be displaced upward until downward bend, which has been previously in the head plate 1, is eliminated by the elastic recovery of the supporting plate 1.

However, after such bend of the head supporting plate 1 is eliminated, the magnetic head 2 cannot follow the surface of the disk 3. Thus, although the conventional head supporting plate 1 can follow the torsional displacement to some extent, the range in which magnetic head 2 can follow the vertical winding of the disk 3 is very limited, because displacement in the vertical direction is very short.

Furthermore, when the disk 3 is forced to wind downward as shown in FIG. 3C, the bend of the head supporting plate 1 soon reaches its limit so that the pressure contact between the magnetic head 1 and the disk 3 becomes excessive, which may result in damages of the head 2 and the disk 3.

SUMMARY OF THE INVENTION

The present invention was created to solve the problem of the prior art described above including the disadvantages.

It is a first object of this invention to provide a magnetic recording-reproducing apparatus which can prevent spacing loss produced by rotation moments generated owing to the rotation of a disk.

A second object of the present invention is to provide a signal recording-reproducing apparatus which can increase the follow-up range with regard to the vertical displacement of a recording medium such as the disk or the like produced by moving it.

In order to achieve those and other objects, one aspect of the present invention provides a signal recording-reproducing apparatus, having read/write elements which slide on each surface of a moving recording medium for reading information from and/or writing information on the each surface, and supporting plates which is supported by an external member and which elastically support the read/write elements, each of the supporting plates comprising:

an installing portion on which one of the read/write elements is mounted;

a fixed portion which is fixed to the external member; and an interconnecting portion whose one end is connected to the installing portion and whose the other end is connected to the fixed portion so as to elastically interconnect the head installing portion and the fixed portion, the one end of the interconnecting portion being positioned closer to a leaving side of the read/write elements from which the moving recording medium leaves from the read/write elements than the other end of the interconnecting portion.

Preferably, the signal recording-reproducing apparatus may further comprise an arm portion situated between both ends of the each interconnecting portion in the lengthwise in such a manner that the arm portions extends along a periphery of the installing portion.

Preferably, each of the supporting plate may have two swing directions about a horizontal axis perpendicular to the moving direction of the recording medium, one of the swing direction being associated with the one end of the interconnecting portion, the other of the swing direction being associated with the other end of the interconnecting portion, and swing force in one of the swing direction being different from swing force in the other of the swing direction.

Preferably, the interconnecting portions of the each of the supporting plates may undergo torsional and/or bending deformations.

According to the present invention, since the elastic recovery force of the supporting plates for the read/write elements is set in accordance with the rotation moments causing spacing loss of the read/write elements, the moments can be offset and efficiently suppressed, and hence spacing loss caused by the separation of the read/write element from the recording medium at the leaving side can be prevented, even if the rotation moments are generated as above mentioned. More specifically, according to the present invention, the follow-up capability of the read/write element with regard to the recording medium can be considerably improved without increasing the pressure applied to the read/write element, whereby generation of spacing loss can be substantially prevented even when the rotation moments are generated as above mentioned.

Furthermore, according to the present invention, the arm portions extended along the installing portion is provided in interconnecting portion which interconnect the installing portion to fixed portion so that the range of the vertical displacement of the installing portion can be increased, and consequently the follow-up range of the read/write element relative to the vertical displacement of the recording medium can be increased, whereby the follow-up capability of the read/write element with regard to the recording medium can be improved.

The above and other objects, effects, features and advantages of the present invention will become more thereof taken in conjunction with the accompanying drawings.

BRIEF DESCRIPTION OF THE DRAWINGS

Embodiments of the invention will now be described, by way of example, and with reference to the accompanying drawings in which.

DETAILED DESCRIPTION OF PREFERRED EMBODIMENTS

Figure 1:
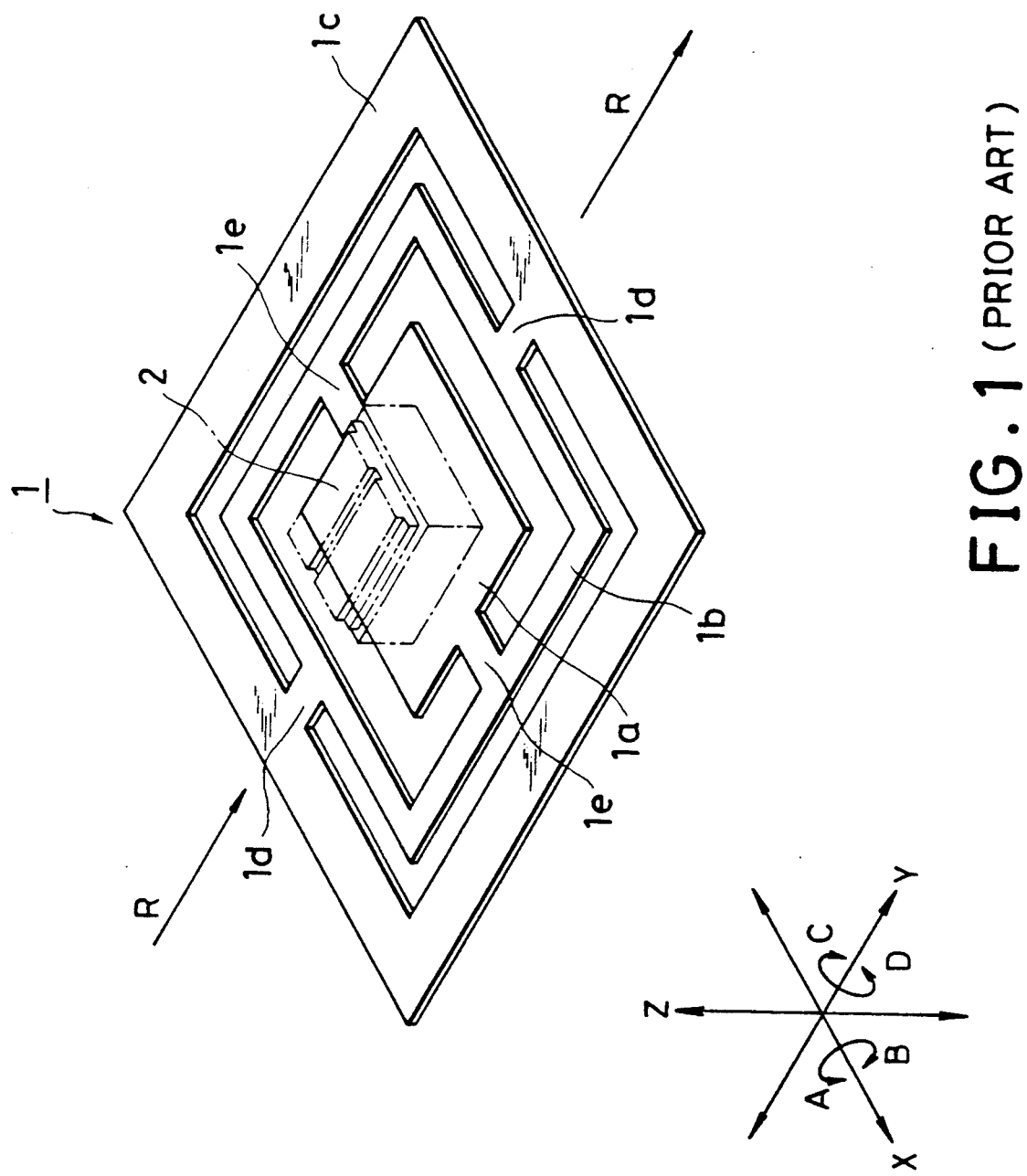
FIG. 1 is a perspective view showing a conventional magnetic head supporting plate.
Figure 2:
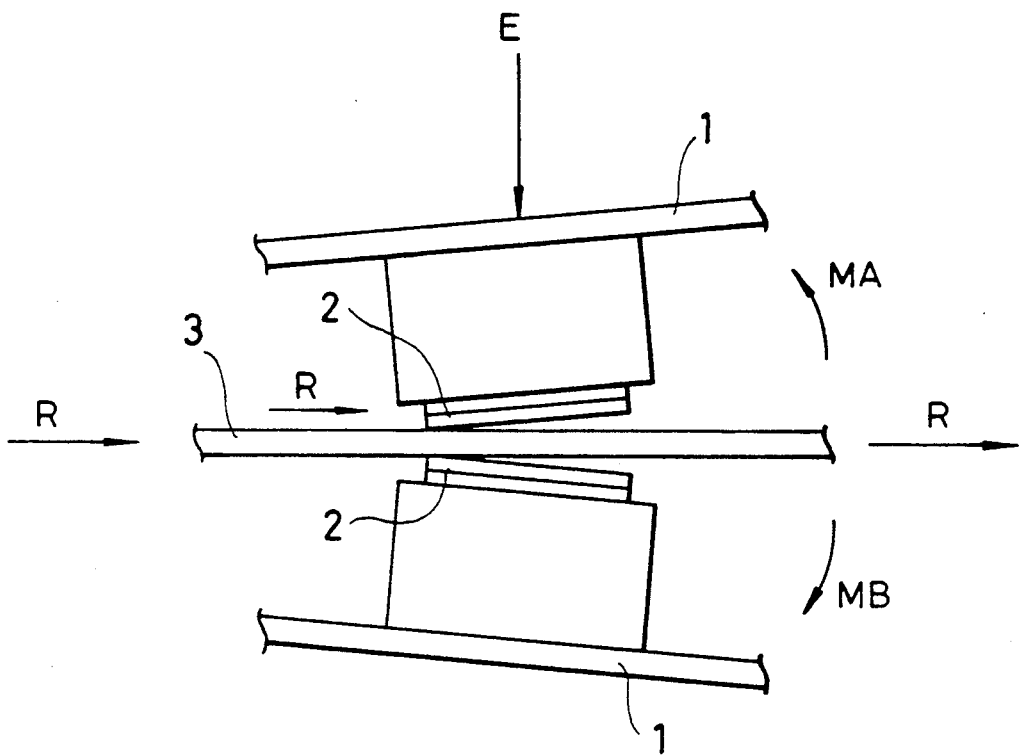
FIG. 2 and FIGS. 3A-3C are side views showing a magnetic head and the magnetic head supporting plate for depicting functional state or condition of the conventional magnetic head supporting plate.
Figure 3C:
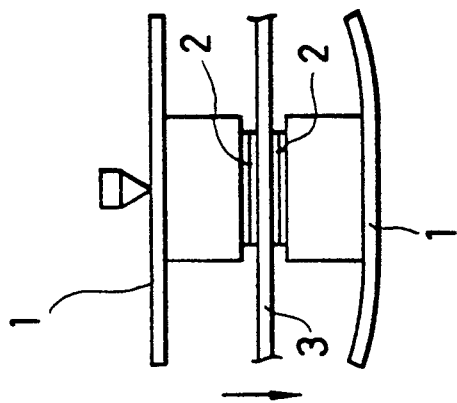
Figure 3B:
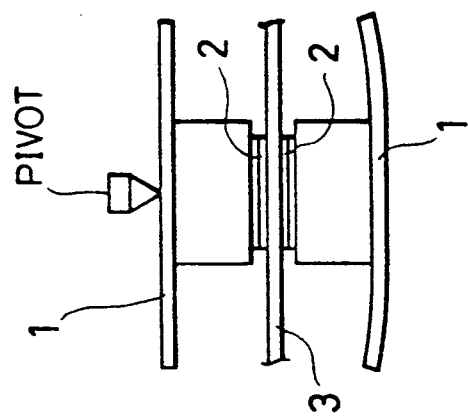
Figure 3A:
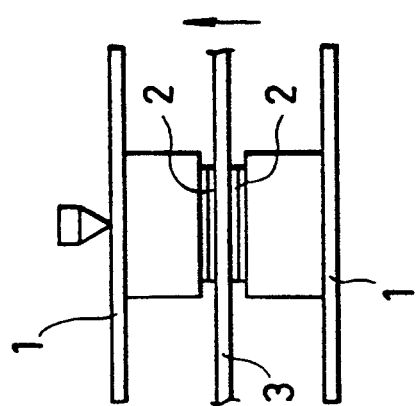

Throughout the following detailed description, similar reference numerals refer to similar and corresponding elements in all figures of the drawings.

First Embodiment, FIGS. 4 through 7C

Figure 4:
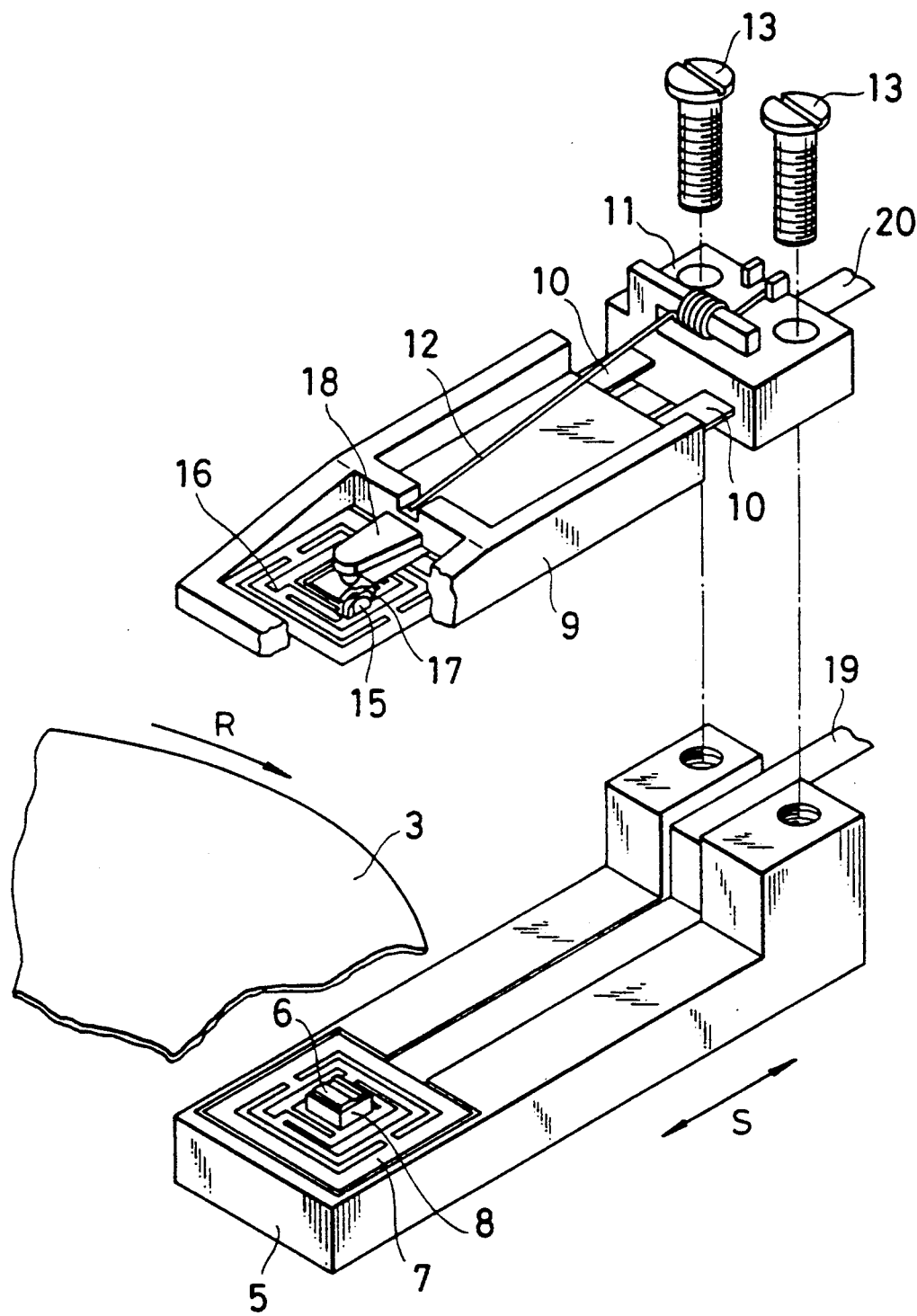
FIG. 4 is a partially exploded perspective view showing major components of a first embodiment of a signal recording-reproducing apparatus in accordance with the present invention.

FIG. 4 is an exploded perspective view illustrating a head supporting mechanism which is one of the major components of a magnetic recording-reproducing apparatus according to the first embodiment of the present invention. In FIG. 4, reference numeral 5 denotes a head carriage with a first magnetic head 6, which is displaced in the radial directions of a disk 3 (indicated by the double-pointed arrow S) by driving means (not shown). On the upper surface of the leading end of the head carriage 5, the first magnetic head 6 is elastically provided via a first head supporting plate 7 so as to slide on the lower surface of a disk 3 for writing information on and reading information from the lower surface. It should be noted that in the first embodiment, a first shield ring 8 is disposed so as to surround the first magnetic head 6, in order to prevent noises from getting into the first magnetic head 6 from external circuits or the like (not shown).

Referring still to FIG. 4, a head arm 9 is supported elastically and displaceably in the vertical direction by lead springs 10 and a supporting plate 11. The head arm 9 is normally pressed downward by means of a loading spring 12. The supporting plate 11 is securely joined to the head carriage 5 with setscrews 13. A second magnetic head 15 for writing information on and/or reading information from the upper surface of the disk 3 is elastically supported by a second supporting plate 16 at the lower surface of the leading end of the head arm 9. As in the first magnetic head 6, a second shield ring 17 is fixed to surround the second magnetic head 15 in order to prevent the head 15 from the picking up external noises. The second magnetic head 15 is disposed opposite to the first magnetic head 6, and the vertical displacement of the second head 15 is limited by a pivot 18 provided on the head arm 9. Furthermore, the second magnetic head 15 can swing about the pivot 18 by a second supporting plate 16.

Figure 5A:
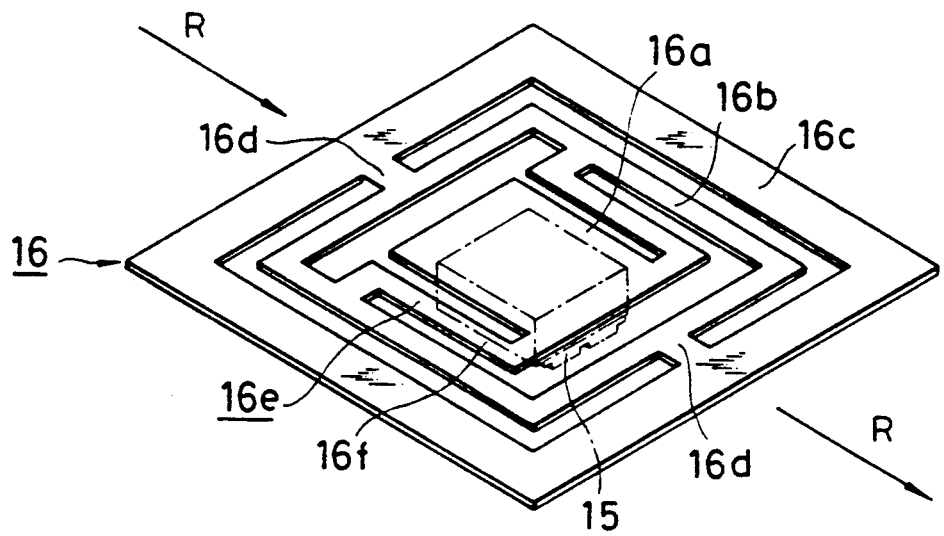
FIGS. 5A and 5B are perspective views, respectively, showing the construction of the magnetic head supporting plate of the first embodiment.
Figure 5B:
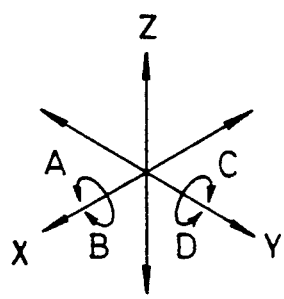
Figure 5B:
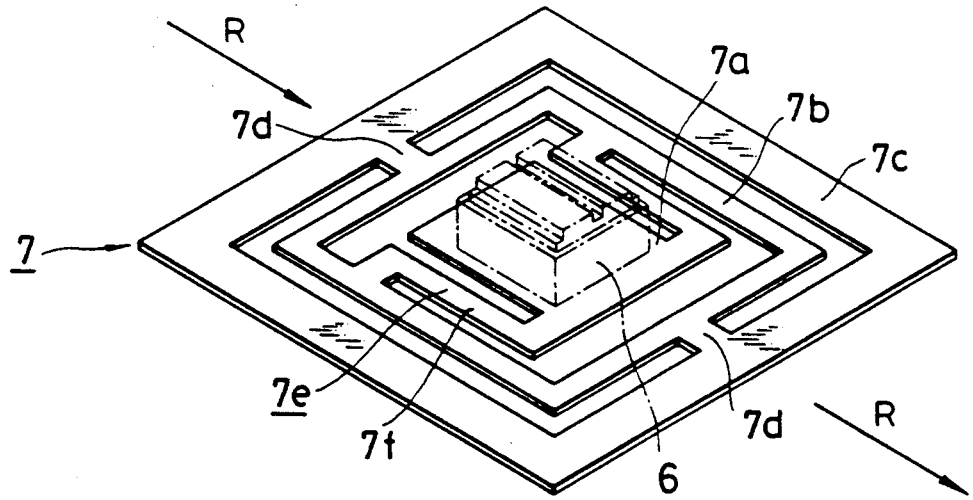

The head supporting plates 7 and 16 in accordance with the first embodiment of the present invention are constructed as shown in FIGS. 5A and 5B, respectively. Since these head supporting plates 7 and 16 are substantially similar in construction and are in plane symmetrical relationship, the detailed description of only the head supporting head 7 will be enough to understand the present invention. Accordingly, the detailed description of the head supporting plate 16 is omitted by using the same reference small letters (a-f) as suffixes of reference numerals to designate corresponding parts in both the first and second head supporting plates 7 and 16.

The head supporting plate 7 (and also 16), is made of a flexible and elastic material and has concentric first, second and third supporting frames 7a, 7b and 7c arranged from the center of the head supporting plate 7 to the outside in the order named (see FIG. 5B). The first magnetic head 6 is mounted on the first supporting frame 7a while the third supporting frame 7c is attached to the head carriage 5. In other words, the first magnetic head 6 is installed to the head carriage 5 through the head supporting plate 7. The first supporting frame 7a and the second supporting frame 7b are interconnected by first tie bars 7e, while the second and third supporting frames 7b and 7c are interconnected by second tie bars 7d so that the first and second supporting frames 7a and 7b are oscillatable relative to the third supporting frame 7c.

Each of the first tie bars 7e is similar in shape to a crankshaft, and interconnects the first and second supporting frames 7a and 7b in the direction perpendicular to the direction of the relative movement of the magnetic head 6 with regard to the disk 3. One end of the tie bar 7e is connected to the first supporting frame 7a at a back side of the head from which the disk 3 leaves the magnetic head, and the other end of the tie bar 7e is connected to the second supporting frame 7b at a front side of the head from which the disk 3 approaches the magnetic head. The intermediate portion in the longitudinal direction of the tie bar 7e defines an arm portion 7f extended in the direction Y, the moving direction of the head 6 relative to the disk 3. Thus, the first supporting frame 7a can swing in the directions A and B with regard the third supporting frame 7c through the intermediary of the second supporting frame 7b because of the tie bar 7e.

On the other hand, the tie bars 7d interconnect the second and third supporting frames 7b and 7c in the direction Y, the moving direction of the head 6 relative to the disk 3. Owing to the elastic deformations of the tie bars 7d, the first supporting frame 7a can swing through the intermediary of the second supporting frame 7b in the directions C and D relative to the third supporting frame 7c.

With the head supporting mechanism thus constructed, in the recording mode or in the reproducing mode, the loading spring 12 presses the head arm 9 downward as in FIG. 4 so that the first and second magnetic heads 6 and 15 sandwich the disk 3 and are made contact with the upper and lower surfaces of the disk 3, respectively. When, the disk 3 is rotated under this condition in the direction indicated by the arrow R in FIG. 4 by a driving means (not shown), the first and second magnetic heads 6 and 15 slide on the upper and lower surfaces of the disk 3, respectively, so that the read or write mode is carried out.

The first and second magnetic heads 6 and 15 are connected through first and second flexible printed circuit boards (termed FPC) 19 and 20, to their corresponding recording-reproducing circuits (not shown), respectively, so that the signals are exchanged between the first and second heads 5, 16 and their corresponding recording-reproducing circuits, respectively. In the recording or reproducing mode described above, even if the rotation moments MA and MB which may cause spacing loss act on the first and second heads 6 and 15, supported by the head supporting plates 7 and 16, respectively, such rotation moments can be cancelled by the head supporting plates 7 and 16.

Figure 6:
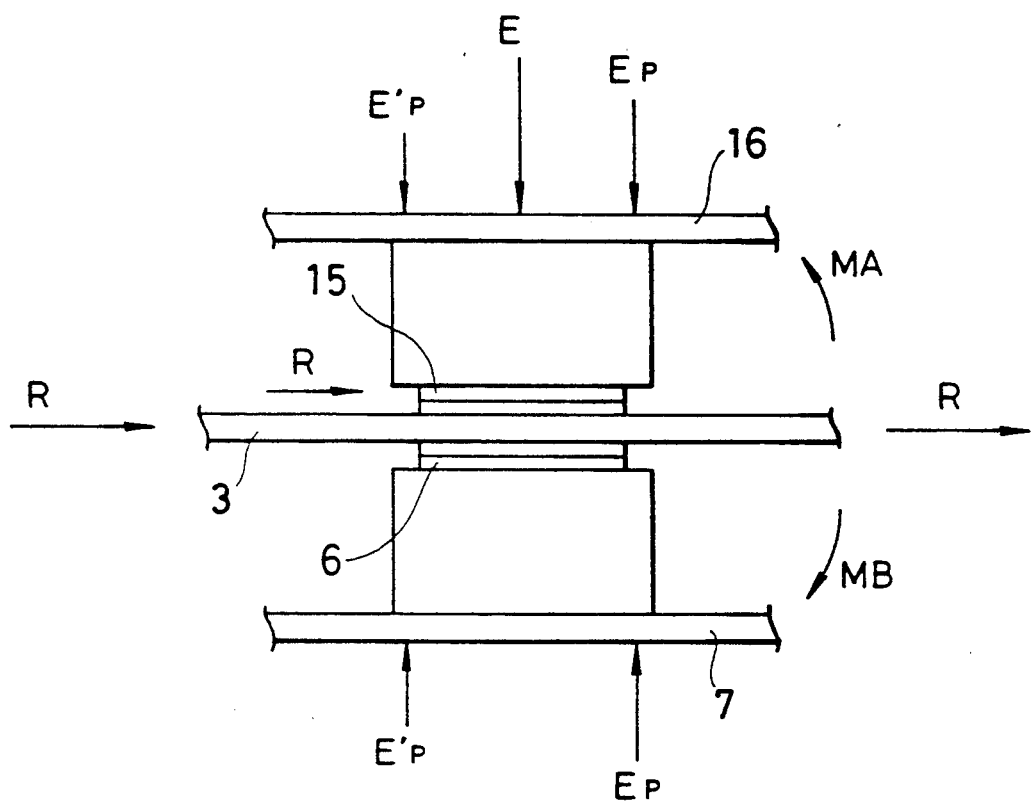
FIGS. 6, 7A, 7B and 7C are side views showing the magnetic head supporting plates and magnetic heads mounted thereon, respectively, for depicting functional state or condition the first embodiment.

More specifically, owing to the elastic deformation (torsional displacement) of the tie bar 7e, the first head supporting frames 7a can swing in the directions A and B relative to the third supporting frame 7c through the second supporting frame 7b. The positions at which both ends of the tie bar 7e are connected to the supporting frames 7a and 7b, however, are separated at the leaving and approaching sides, that is, the front and back sides in the running direction of the disk 3 as best shown in FIG. 5B. Therefore, as best shown in FIG. 6, the elastic recovery force Ep of the tie bar 7e, relative to the first supporting frame 7a acts on the leaving side (the right hand side in FIG. 6). As a result, the force Ep cancels both the rotation moments MA and MB which would cause spacing loss, i.e., the separation of the leaving side of the head 6 from the disk 3. In this case, the elastic recovery force Ep can be made weaker than the elastic recovery force E which would be required to cancel the rotation moments when the forth E would act at the center of the first supporting frame 7a. Therefore, as compared with the conventional head supporting plates, it becomes possible to cancel the rotation moments MA and MB more efficiently so that spacing loss can be prevented without increasing the pressure of contact between the heads 6 and 15 and the disk 3. In this case, it is quite apparent to those skilled in the art that the closer the connecting point of the tie bar 7e to the leaving side, the weaker the spring-back force Ep in comparison with the spring-back force Ep' required when the connecting point is placed at the entering side. In addition, the arm portion 7f acts as a leaf spring so that the elastic recovery force of the arm portion 7f also serves to cancel the rotation moments MA and MB.

Moreover, according to the first embodiment, the whole length of the tie bar 7e is increased by providing the arm portion 7f extending in the lengthwise of the tie bar 7e. Thus, the displacement of the first supporting frame 7a in the vertical direction Z (See FIG. 5B) can be increased, and consequently, the follow-up capability of the heads 6 and 15 relative to the disk 3 can be improved.

Figure 7C:
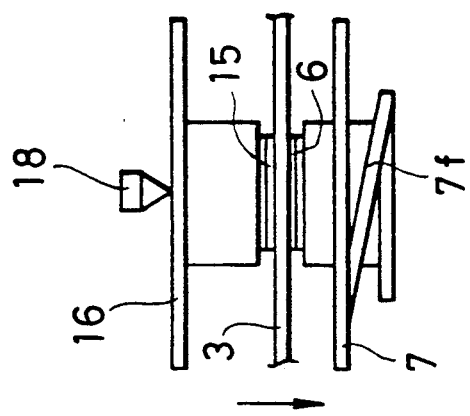
Figure 7B:
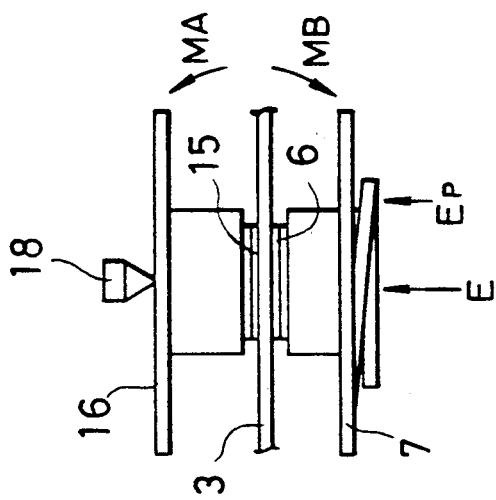

With the head supporting mechanism with the above-described construction, in the recording mode or the reproducing mode, the loading spring 12 presses the head arm 9 downward as in FIG. 4. Accordingly, as shown in FIG. 7B, the recording heads 6 and 15 sandwich the disk 3, and are pressed against the upper and lower surfaces of the disks, respectively, by the pressure force. Furthermore, the tie bars 7d and 7e of the lower supporting plate 7 are forcibly deformed by the pressure force so that the magnetic head 6 is disposed at a lower position.

Figure 7A:
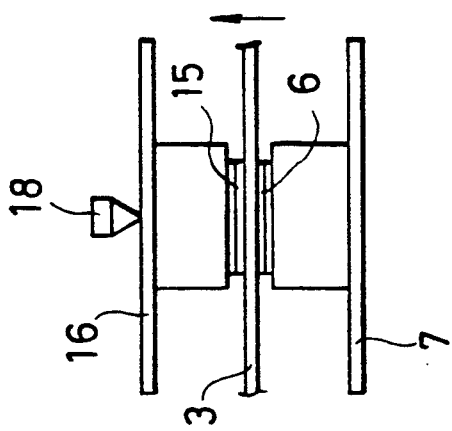

When the disk 3 is displaced upward under the above-mentioned condition during its rotation, the head supporting plate 7 and the head 6 are displaced upward following the upward movement of the disk 3 as shown in FIG. 7A. In contrast with this, when the disk 3 is displaced downward during its rotation, the head supporting plate 7 and the head 6 are displaced downward following the downward movement of the disk 3 as shown in FIG. 7C. In this case, because of the provision of the arm portion 7f, the displacement range of the head and its associated components increases as compared with the conventional displacement range relative to the prior art head supporting mechanism so that the follow-up range of the head 6 to the disk 3 can be increased.

In the first embodiment of the present invention, the arm portions 7f have been described as being arranged in parallel with the peripheries or outer sides of the first supporting frame 7a which installs the head, but it is to be understood that the present invention is not limited to such arrangement only. For instance, this arm portion can draw an arc so as to approach the outer sides of the first supporting frame 7a. In addition, the present invention has been described in detail when it is applied to a magnetic signal recording-reproducing apparatus, but it is apparent that the present invention can be equally applied to other signal recording-reproducing apparatuses using nonmagnetic read/write systems.

Figure 8:
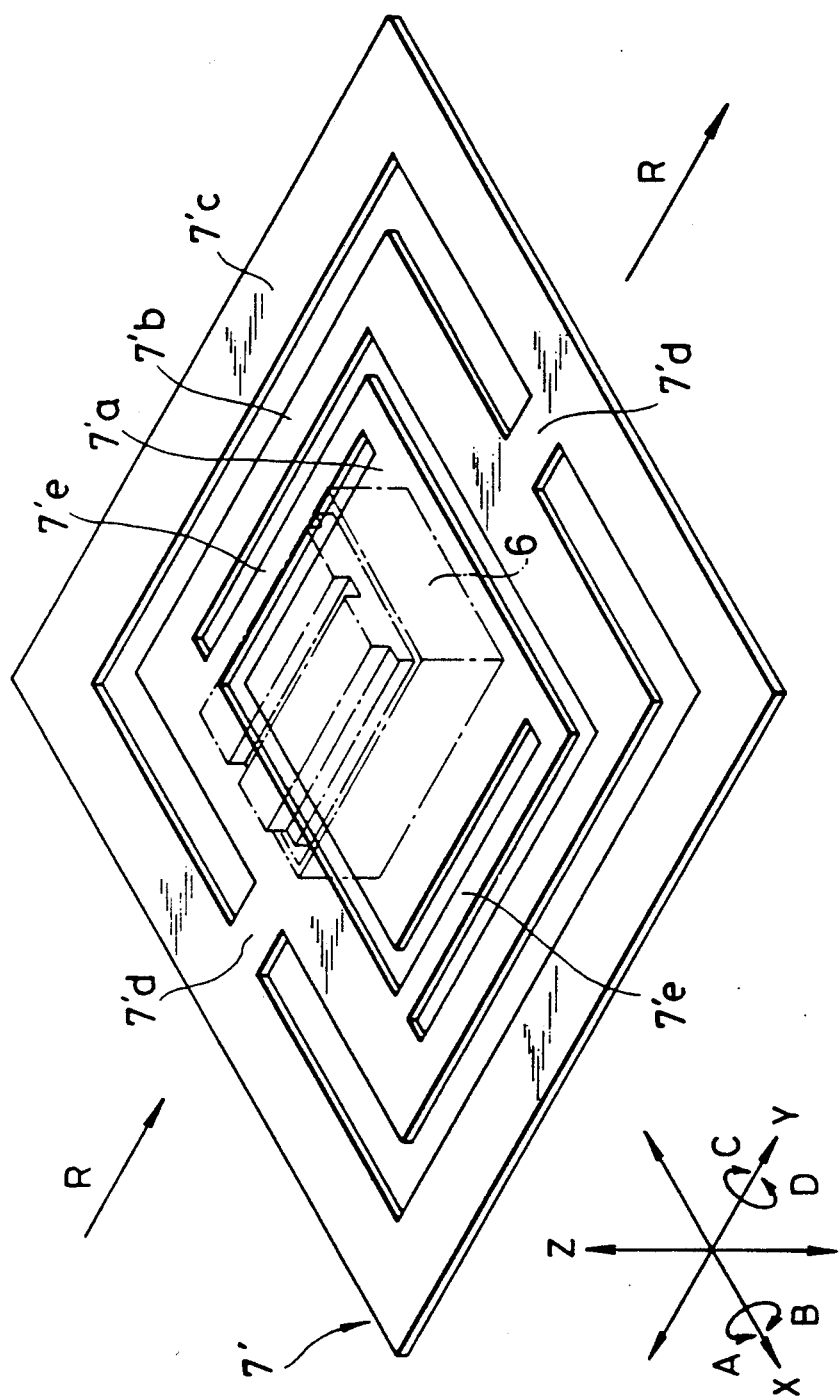
FIG. 8 is a perspective view showing a magnetic head supporting plate in accordance with a second embodiment of the present invention.

Second Embodiment, FIG. 8

FIG. 8 illustrates a second embodiment of a head supporting plate in accordance with the present invention. As shown in FIG. 8, tie bars 7'e of a head supporting plate 7' are cantilevers extending straight from a second supporting frame 7'b in the direction of the movement of the head 6 relative to the disk 3 (indicated by the double-pointed arrow Y in FIG. 8). The other ends of the tie bars 7'e are bent and connected to a first supporting frame 7'a. In the recording or reproducing mode, the swing motion in the direction B about the X-axis is affected by the bending deformations of the cantilever-like tie bars 7'e so that effects similar to that of the first embodiment can be attained.

Although specific embodiments of a signal recording-reproducing apparatus constructed in accordance with the present invention have been disclosed, it is not intended that the invention be restricted to either the specific configurations or the uses disclosed herein.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In a signal recording and/or reproducing apparatus having a chassis, a read/write head arrangement comprising:
    a read/write head for sliding in contact with a surface of a moving flexible recording medium and for reading information from and writing information onto the surface of the moving flexible recording medium; and
    a head supporting plate for elastically supporting said read/write head, said head supporting plate including:
        a first supporting frame (7a) for mounting said read/write head,
        a second supporting frame (7b) elastically connected to said first supporting frame (7a) by a first pair of tie bar portions (7e), and
        a third supporting frame (7c) for fixing said head supporting plate to the chassis of the recording and/or reproducing apparatus, said third supporting frame (7c) being elastically connected to said second supporting frame (7b) by a second pair of tie bar portions (7d);
    wherein connecting points between said first pair of tie bar portions (7e) and said first supporting frame (7a) mounting said read/write head are disposed nearer a trailing side of said read/write head with respect to a direction of movement of the recording medium (R) than connecting points between said first pair of tie bar portions (7e) and said second supporting frame (7b).

2. A read/write head arrangement in a signal recording and/or reproducing apparatus as claimed in claim 1, wherein first ends of said first and second pair of tie bar portions (7e,7d) form connecting points to said first supporting frame (7a) and said third supporting frame (7c), respectively, on the trailing side of a center of said read/write head with respect to the direction of movement (R) of the recording medium.

3. A read/write head arrangement in a signal recording and/or reproducing apparatus as claimed in claim 2, wherein second ends of said first and second pair of tie bar portions (7e,7d) form connecting points to said second supporting frame (7b) and said third supporting frame (7c), respectively, on a leading side of a center of said read/write head with respect to the direction of movement (R) of the recording medium.

4. A read/write head arrangement in a signal recording and/or reproducing apparatus as claimed in claim 3, wherein said first supporting frame for mounting said read/write head has two swing directions (A,B) about a horizontal axis (x) perpendicular to the moving direction (R) of said recording medium, one of said swing directions being associated with said first ends of said first pair of tie bar portions, the other of said swing directions being associated with said second ends of said first pair of tie bar portions, and wherein swing force in one direction of said swing directions is different from swing force in the other direction of said swing directions.

5. A read/write head arrangement in a signal recording and/or reproducing apparatus as claimed in claim 3, wherein said first pair of tie bar portions (7e) each include an arm portion (7f) which extends in the moving direction (R) of said recording medium between respective first and second ends of said first pair of tie bar portions (7e).

6. A read/write head arrangement in a signal recording and/or reproducing apparatus as claimed in claim 1, wherein said first pair of tie bar portions are designed to undergo at least one of torsional and bending deformations.

7. A read/write head arrangement in a signal recording and/or reproducing apparatus as claimed in claim 1, wherein said second pair of tie bar portions (7d) allow said second supporting frame (7b) to move swingably about an axis (Y) thereof which extends in the moving direction (R) of said recording medium.

8. A read/write head arrangement in a signal recording and/or reproducing apparatus as claimed in claim 1, wherein said second pair of tie bar portions have a relatively higher rigidity against torsion than said first pair of tie bar portions.

9. A head assembly for a signal recording and/or reproducing apparatus comprising:
   a read/write head for sliding on a surface of a moving flexible recording medium and reading information from and/or writing information onto said each surface of said recording medium; and
   a head supporting plate for elastically supporting said read/write head, said head supporting plate including:
      fixing means (7c) for fixing said head supporting plate to a chassis of said signal recording and/or reproducing apparatus;
      head mounting means (7a) for mounting said read/write head thereon; and
      frame means (7b), elastically supported in said fixing means by a first pair of interconnecting portions (7d), for elastically supporting by a second pair of interconnecting portions (7e), said head mounting means;
   wherein connecting points between said head mounting means (7a) and said second pair of interconnecting portions (7e), and connecting points between said frame means (7b) and said second pair of interconnecting portions (7e), are disposed behind and in front of a center of said head, respectively, relative to a moving direction of said recording medium.

10. A head assembly for a signal recording and/or reproducing apparatus as claimed in claim 9, wherein said first pair of interconnecting portions have a higher rigidity against torsion than said second pair of interconnecting portions.

11. A head supporting assembly for a rotating disk storage device comprising:
   a head carriage (5) extending and being displacable in a radial direction (S) of a rotating disk (3);
   a head arm mounting plate (11) removably attached to said head carriage and provided with leaf springs (10);
   a head arm (9), flexibly mounted by said leaf springs (10) to said head arm mounting plate (11) and extending in the radial direction (S) of the rotating disk (3) above said head carriage (5);
   a loading spring (12) mounted on said head mounting arm plate (11) and urging said head arm (9) towards said head carriage (5);
   first and second magnetic read/write heads (6,15); and
   first and second head supporting means (7,16) for elastically supporting said first and second magnetic read/write heads (6,15), respectively, the first head supporting means (7) being disposed on an end of said head carriage (5), the second head supporting means (16) being disposed on said head arm (9) opposite said first head supporting means (7), whereby, during operation, said first and second magnetic read/write heads (6,15) are disposed on opposites sides of a rotating disk (3) facing opposite surfaces thereof;
   wherein said first and second head supporting means (7,16) each comprise:
      a first supporting frame (7a) for mounting a respective read/write head,
      a second supporting frame (7b) elastically connected to said first supporting frame (7a) by a first pair of tie bar portions (7e), and
      a third supporting frame (7c) for fixing said head supporting plate to the respective head carriage (5) or head arm (9), said third supporting frame (7c) being elastically connected to said second supporting frame (7b) by a second pair of tie bar portions (7d); and
   wherein, for each head supporting means (7,16), connecting points between said first pair of tie bar portions (7e) and said first supporting frame (7a) are disposed nearer a trailing side of said head supporting assembly with respect to a rotation direction (R) of a rotating disk (3) than connecting points between said first pair of tie bar portions (7e) and said second supporting frame (7b).

* * * * *